July 20, 1943.  F. W. GANS  2,324,574
MEANS FOR THE MANUFACTURE OF FLOOR COVERINGS OR THE LIKE
Filed Jan. 29, 1941  3 Sheets-Sheet 1
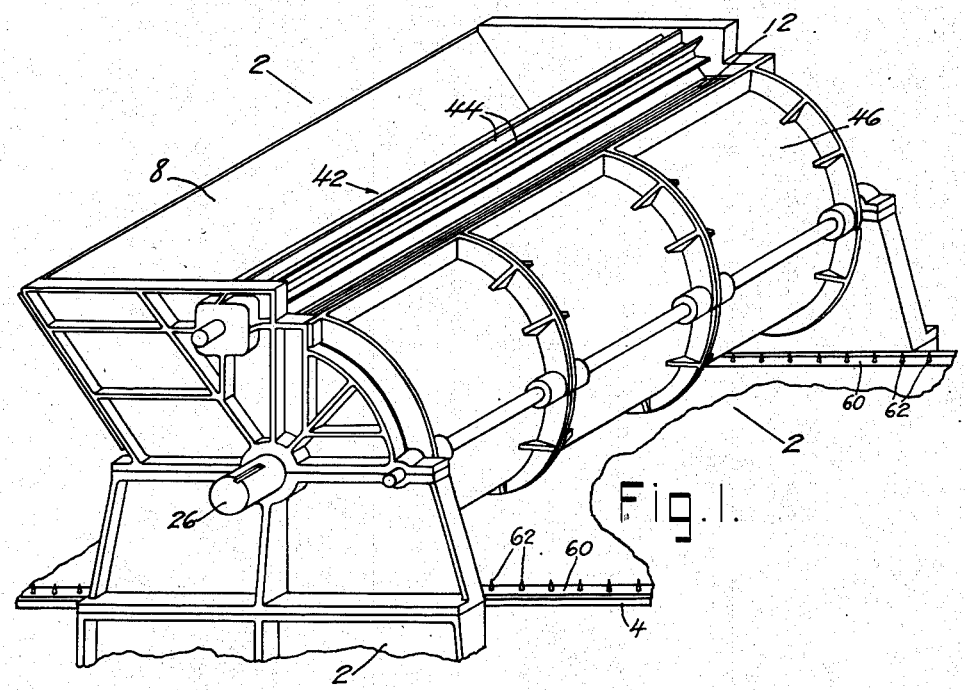
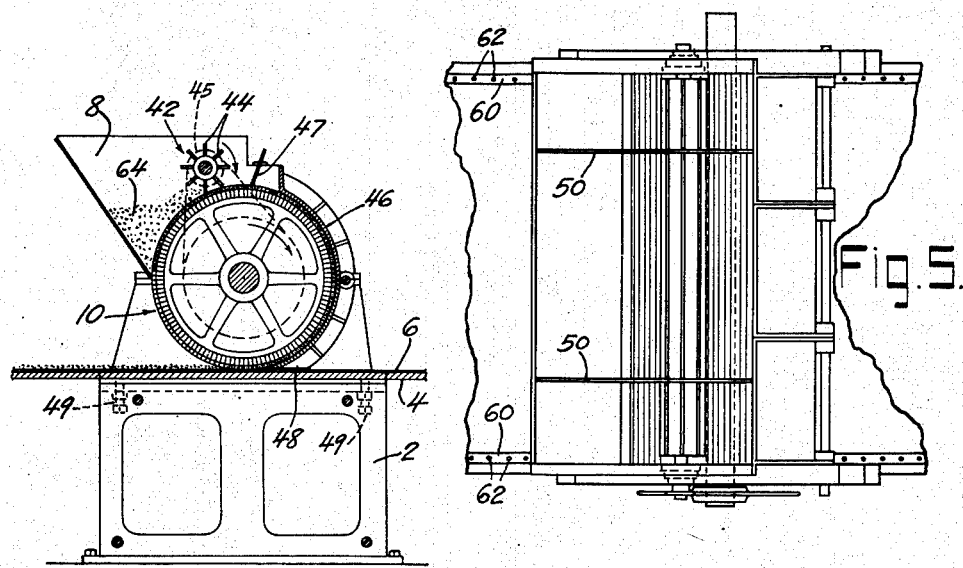
INVENTOR.
FRED W. GANS.
BY Albert Sperry
ATTORNEY.

July 20, 1943.  F. W. GANS  2,324,574
MEANS FOR THE MANUFACTURE OF FLOOR COVERINGS OR THE LIKE
Filed Jan. 29, 1941  3 Sheets-Sheet 2
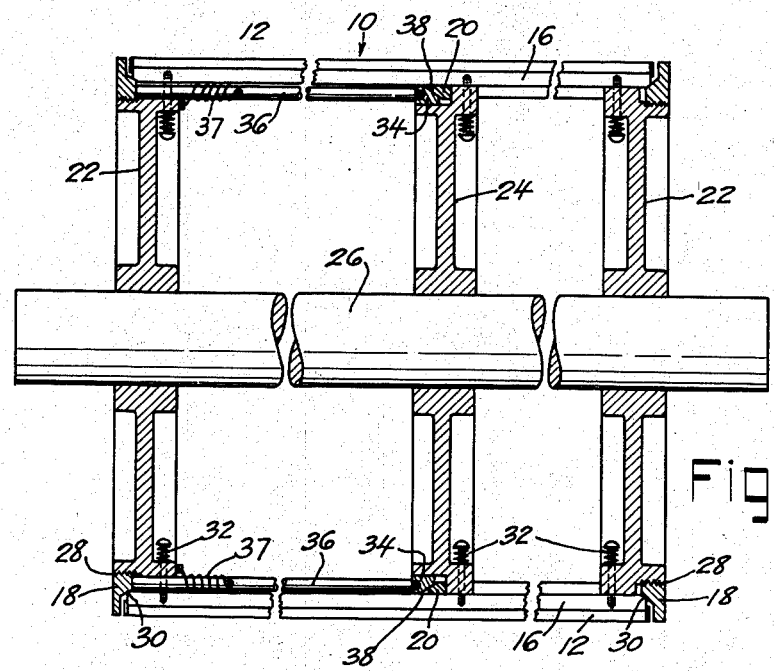
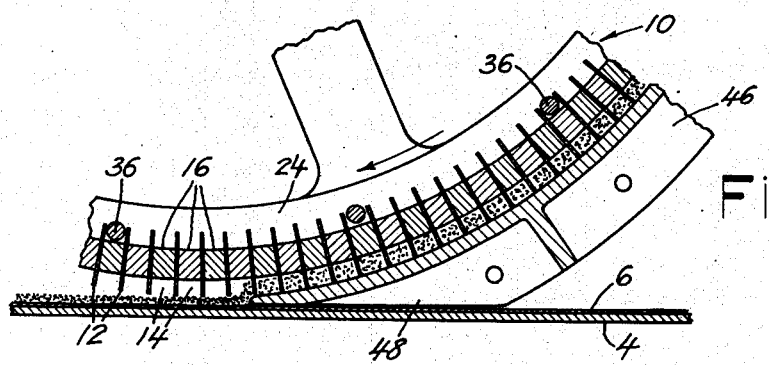
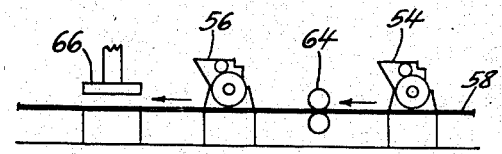
INVENTOR.
FRED W. GANS.
BY Albert Sperry
ATTORNEY.

July 20, 1943.  F. W. GANS  2,324,574
MEANS FOR THE MANUFACTURE OF FLOOR COVERINGS OR THE LIKE
Filed Jan. 29, 1941  3 Sheets-Sheet 3
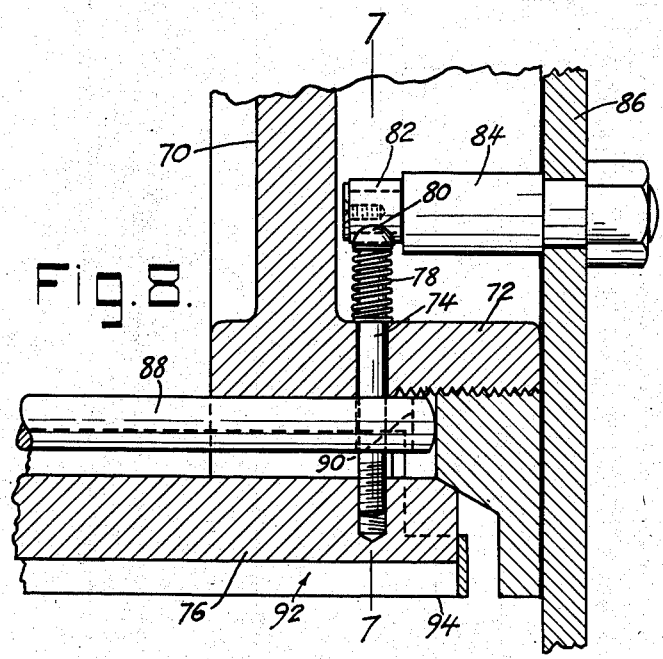
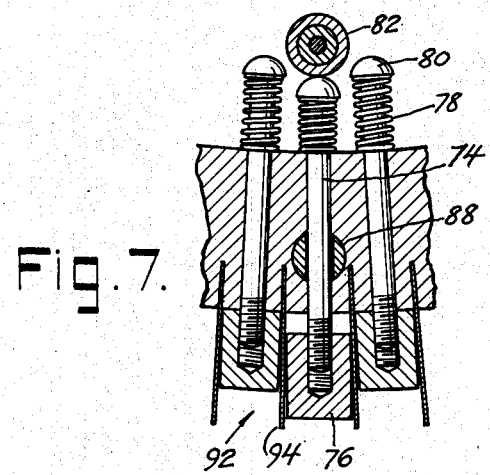
INVENTOR.
FRED W. GANS.
BY
Albert Sperry
ATTORNEY.

Patented July 20, 1943

2,324,574

UNITED STATES PATENT OFFICE 2,324,574

MEANS FOR THE MANUFACTURE OF FLOOR COVERINGS OR THE LIKE

Fred W. Gans, Trenton, N. J., assignor to Sloane Blablon, Trenton, N. J., a corporation of New Jersey Application January 29, 1941, Serial No. 376,427

8 Claims. (Cl. 154—23)

My invention relates to machines and methods for producing floor coverings or the like by applying a layer of granules of uncured linoleum to a backing and subsequently pressing or otherwise treating the material to produce a finished product. While the invention is of general application it is especially adapted for use in producing products having a design thereon which simulates granite or other stone in appearance.

Heretofore in the production of granite-like designs in linoleum it has been usual to mix granules or small lumps or pellets of uncured linoleum of different shades or colors in such proportions as to give the desired granite-like appearance to the finished product. These granules have been applied to the surface of burlap or other backing material by pouring them onto a coarse screen which is spaced from the surface of the backing a distance equal to the thickness of the layer of granules to be applied. The granules are then spread or moved about over the screen to cause them to pass through the openings in the screen and be uniformly distributed over the backing as a continuous layer. The excess granules are then removed and the backing carrying the layer of granules is advanced to a press while another section of the backing is covered with granules in the same manner.

This method is slow and discontinuous in operation and unsatisfactory because the application and distribution of the granules is irregular and dependent upon the skill of the operator in spreading the granules and in removing the excess from the top of the screeen. These uncertainties in the operation not only give rise to irregularities in the gauge or thickness of the finished product but also produce variations in the design, resulting in an inferior product.

In order to overcome these objections to machines and methods of the prior art I have developed a machine which may be operated continuously or intermittently as desired and one which assures uniformity of distribution of the granules so that variations and uncertainties incident to hand operations are eliminated. It is therefore possible to produce a superior product at less expense and more rapidly than has been possible heretofore.

These advantages are attained in accordance with my invention by means of a rotatable or movable carrier device having pockets thereon to which granules of the colored and uncured linoleum are supplied and by which they are deposited on the backing material used. The granules are supplied to the carrier device in such a way as to insure uniformity in the thickness and distribution of the granules whereby the gauge and density of the finished product is rendered uniform. Moreover the thickness of the layer of granules and the gauge of the finished material may be varied quickly and easily to produce either a thin or a thick linoleum layer. The machine and method also may be operated in a continuous or a discontinuous manner permitting the use of an intermittently operating flat press or a continuously operating roll press for compressing and bonding the granules to the base material and to each other. Moreover the invention is adapted for use in forming linoleum having various designs formed therein by depositing differently colored granules of uncured linoleum on different areas of a backing material while covering the backing with granules or other covering material to a uniform thickness to produce a product of uniform gauge but embodying various design elements.

One of the objects of my invention is to produce linoleum floor coverings of uniform gauge from granules of uncured linoleum.

Another object of my invention is to provide improved methods and means for producing linoleum floor coverings from granules of uncured linoleum whereby the operation of depositing and distributing the granules on a backing may be carried out in either a continuous or a discontinuous manner and with assurance in the uniformity of the results obtained.

A further object of my invention is to provide a novel type of machine for depositing granules of uncured linoleum on a sheet of backing material.

Another object of my invention is to provide a novel method of making linoleum wherein granules of uncured linoleum are filled into pockets or spaces to a uniform depth and thereafter discharged from the pockets onto adjacent areas of a sheet of backing material to form thereon a continuous layer of granules of uniform depth.

These and other objects and features of my invention will appear from the following description thereof wherein reference is made to typical machines embodying my invention and illustrated in the figures of the accompanying drawings:

In the drawings:

Fig. 1 is a perspective of a typical machine embodying my invention;

Fig. 2 is a vertical sectional view of the construction illustrated in Fig. 1 taken on the line 2—2 thereof;

Fig. 3 is an enlarged longitudinal sectional view of the drum illustrated in Figs. 1 and 2;

Fig. 4 is an enlarged vertical sectional view of a detail of the construction shown in Fig. 2;

Fig. 5 is a top plan view of the machine illustrated in Fig. 1; and

Fig. 6 is a diagrammatic illustration of an alternative type of construction embodying my invention.

Fig. 7 is a vertical sectional view taken on the line 7—7 of Fig. 8 illustrating a portion of a modified construction for positively ejecting the granules of linoleum from the pockets on the drum and Fig. 8 is a vertical sectional view of the construction illustrated in Fig. 7.

In that form of my invention illustrated in Figs. 1 to 5 the machine employed is supported on a base 2 above a platform 4 over which a web or sheet of backing material 6 may be passed. The upper portion of the machine includes a hopper 8 the front of which is substantially closed by a movable carrier such as the drum 10 which is provided with a number of radially extending fins 12 defining granule receiving pockets or spaces 14. The bottoms of the pockets 14 are formed by the flat outer faces of bars 16 which bear against adjustable end supporting rings 18 and one or more central supporting rings 20 for moving the bars radially on the drum 10 to vary the depth of the pockets 14.

As shown in Fig. 3 the drum 10 is formed at its opposite ends with spiders 22 and with at least one center spider 24 through which the drive shaft 26 extends. The spiders are provided on their peripheries with slots receiving the radially projecting fins 12 to hold the fins firmly in position. The fins shown are thin and spaced apart a suitable distance, say three fourths of an inch to form long narrow, closely positioned pockets but it will be evident that the position and arrangement of the fins may be varied as desired for simplicity of construction. The spiders also carry the supporting rings 18 and 20. As shown, the end spiders 22 are formed with threads 28 which are engaged by complementary threads on the end supporting rings 18. The bearing surfaces 30 of the rings 18 are inclined so that upon rotation thereof the ring will be moved inward or outward and the inclined bearing surface 30 will be shifted to vary the radial position of the outer faces of the bars 16 which form the bottoms of the pockets on the drum. The springs 32 urge the bars radially inward so that as the rings 18 are moved outward the depth of the pockets is increased whereas when the rings are moved inward the depth of the pockets is decreased.

The center spider 24 carries a similarly beveled ring 34 which is adjusted with the end rings 18 through rods 36 and urged to the left as seen in Fig. 3 by springs 37 to retract the ring 34 when end ring 18 is moved outward. The beveled surface 38 of ring 34 is thus moved inward or outward with the end rings to expand or permit contraction of the split central supporting ring 20. The position of the end rings 18 and connected rings 34 with respect to the spiders may be indicated by an index and graduations so that both end rings may be adjusted in a like manner and the center supports similarly adjusted to maintain the depth of the pockets 14 uniform throughout the width of the machine.

The upper portion of the machine is provided with means to level off the granules of uncured linoleum which fill the pockets 14 and for this purpose a movable doctor in the form of a rotatable member 42 having a number of blades 44 is positioned near the top of the drum 10. The member 42 is driven by the chain 45 and its movement is coordinated with that of the drum 10 so that the blades 44 sweep over each pocket 14 in the same manner to remove the excess granules and return them to the hopper 8. The granules in each pocket are thus leveled off in exactly the same manner and substantially even with the outer edges of the fins whereby the depth and density of the granules in each pocket is maintained uniform. An additional stationary or reciprocating doctor-blade 47 may also be provided if desired but in practice it is found that this element is not generally necessary.

After the pockets 14 have been filled with granules of uncured linoleum and leveled off by the movable doctor and while they are still in an upright position they pass beneath a shield 46 which extends from a point near the upper portion of the drum, about the drum to a point adjacent the bottom of the drum, to hold the granules in place in the pockets as they are inverted when the drum rotates. The lower edge 49 of the shield 46 is positioned close to the upper surface of the backing material 6 passing over the platform 4 so that as the backing material is passed through the machine, the granules of uncured linoleum will be discharged from the pockets onto the upper surface of the backing material.

The relation of the hopper 8 with respect to the drum 10, rotatable member 42 and shield 46 are designed to avoid crowding, packing or compression of the linoleum granules in filling the pockets. This is accomplished by arranging the hopper so that it has an open side which communicates with that portion of the drum which is moving nearly vertically upward and throughout an arc of about 90 degrees extending to the uppermost horizontally moving portion of the drum. The granules of linoleum composition in the hopper therefore tend to move upward with the drum as it rotates and since they are unrestricted in their movement or are restricted only by other granules in the hopper they are readily displaced without being compressed or packed together as they move toward an exit with the drum. Moreover, the rotatable member 42 is located in the upper portion of the hopper in position to remove the excess granules from the pockets as they approach their vertical positions so that the granules are not crowded together or appreciably squeezed or compressed in filling the pockets or when passing on beneath the doctor blade 47 (when used) and the shield 46. In this way the granules remain loose and fill all of the pockets uniformly. They also remain loose when passing beneath the shield 46 so that they will be readily discharged from the pockets. It is therefore possible to avoid unequal density of the material due to local packing of the granules in passing from the hopper and beneath the shield and to avoid the possibility of the particles sticking to the sides and bottom of the pockets and incompletely discharging the granules when inverted.

The movement of the backing material through the machine is coordinated with the movement of the drum so that each pocket in turn will deposit the granules onto an adjacent area of the backing to provide a continuous layer of particles of uniform thickness throughout the upper surface of the sheet of backing material. The platform 4 over which the web of backing material 6 is passed is movable relative to the drum 10 by adjusting screws 49 so as to space the upper surface of the backing material from the extremities of the fins 12 a distance slightly greater than the gauge of the material to be produced. In this way the fins just clear the surface of the granules deposited on the backing material and do not disturb the granules after they are so arranged.

After the backing material has been covered by the granules it is passed to a suitable pressing device which may be of a flat or rotary type for intermittent or continuous heating and pressing of the material.

While the invention is particularly adapted for use in producing material having a design simulating granite or stone it may be used to produce products having a uniform color throughout. Furthermore as illustrated in Fig. 5 the hopper as well as the fins may be provided with removable or adjustable partitions indicated at 50 so that differently colored granules may be supplied to the different selected portions of the hopper and to laterally adjacent portions of the pockets to produce floor covering having various longitudinally extending design areas of contrasting color. In a similar way, the invention may be used to apply longitudinally extending design element to the center or edges only of the backing material by filling only the center or outer compartments of the hopper 8 with the granules of uncured linoleum. The uncoated portions of the backing material may be provided with other types of linoleum products to produce novel and characteristic floor coverings having a part only of the design formed of granite-like material or other design elements formed on uncured granules of linoleum.

As illustrated diagrammatically in Fig. 6 two or more machines 54 and 56 embodying the present invention may be operated in series to apply differently colored granules of material to different areas of the backing material. Thus for example the machine 54 may apply a granite-like mixture of uncured granules of linoleum to the central portion of the backing material 58 as it passes beneath the machine, whereas the second machine 56 may apply marginal design elements of a single color to the edges of the sheet of backing material. By the omission of selected pockets in the drums of the successive machines 54 and 56 or by other modifications thereof the first machine 54 may be caused to deposit granules of linoleum in certain squares or design areas of the backing material while the succeeding machines such as 56 may apply other and contrasting colored granular material to other areas of the backing. In this way tile-like designs or other attractive floor coverings embodying various design elements may be produced at will.

In operations embodying my invention and when using the machine described above a web of backing material 6 consisting of burlap, saturated felt or other suitable material is passed over the support 4 and beneath the drum 10 so as to travel at the same speed as the drum. The backing is advanced by suitable or conventional means such as the bands 60 having pins 62 engaging marginal portions of the backing material.

The hopper 8 of the machine is supplied with granules of uncured linoleum indicated at 64 and which may be of a single color but preferably are of different colors or shades to produce a granite-like design in the finished product. The drum 10 carrying the fins 12 is rotated in the direction of the arrow in Fig. 2 so as to cause the pockets or spaces 14 between the fins to be filled with the granules and be moved to an upright position. As the pockets of granules approach the top of the drum the rotating doctor blades 44 level off the granules even with the tops of the fins 12. The filled and evened pockets of granules then pass beneath the shield 46 and are inverted as the drum 10 rotates while the shield holds the granules in the pockets. As the inverted pockets pass the end 48 of the shield 46 they are uncovered and discharge the granules onto the upper surface of the backing material 6. Since the backing and drum travel at the same speed each pocket deposits its granules on the area of the backing directly adjacent the area covered by the granules discharged from the preceding pocket on the drum. The fins 12 are thin and therefore there is no observable separation of the granules discharged from one pocket from those discharged from the adjacent pockets and the upper surface of the backing is covered to a uniform depth with the granules. The drum and pockets continue to rotate and pass on to the hopper to be refilled while the backing carrying the granules passes on to a suitable press where the granules are subjected to heat and pressure to bond them to each other and to the backing material or are otherwise treated for producing a finished product.

When it is desired to change the thickness of the layer of granules applied to the backing to provide a thicker or thinner layer of linoleum in the finished product the rings 18 and 20 may be readily adjusted to move the bars 16 radially inward or outward on the drum so as to increase or decrease the depth of the pockets 14 as desired.

As shown in Fig. 5 the hopper may be divided by partitions 50 to supply granules of one color to the marginal portions of the pockets and granules of another color to the central portions of the pockets to produce floor coverings having longitudinally extending design elements of different colors or appearance.

In the alternative the central or marginal portions of the hopper may be left empty to cause granules to be deposited on the backing in only predetermined areas thereof and other linoleum or covering materials may be deposited on the backing in the remaining areas either before or after the granules are applied thereto. In a similar way by covering or omitting certain of the pockets on the drum or carrier the granules may be deposited in discontinuous areas of the backing to form tile-like or intricate designs as desired.

As shown in Fig. 6 two or more machines may be used in succession to deposit granules of different colors or characteristics in different areas of the material or to apply additional granules to certain areas for forming products with embossed characteristics. If desired a roll or other heating and pressing element 64 may be used to treat the granules applied to the backing by the machine 54 and a second heating and pressing element such as a flat press 66 may be used to treat the granules or material applied by the second machine 56.

In the type of drum or carrier illustrated in Figs. 3 and 4 and described above the granules of uncured linoleum are discharged from the pockets 14 between fins 12 by gravity. While this is generally satisfactory it may in some instances be desirable to positively eject the granules from the pockets and onto the backing material.

As illustrated in Figs. 7 and 8 this may be effected by providing a drum 70 with an end flange 72 through which the spring pressed pins 74 extend into threaded engagement with ejector bars 76. The springs 78 about the pins 74 urge the bars to retracted positions whereas each bar in turn is projected at a predetermined point by engagement of the rounded inner head 80 on each pin with a roller 82 carried by a bolt 84 secured to the side frame 86 of the machine. The adjustment rods 88 (corresponding to the rods 36 of Fig. 3) are slotted at 90 so that a pin 74 may pass through the rod without interfering with its operation.

With this construction each of the pockets 92 between the fins 94 on the drum may be filled with granules and the granules may even be pressed into the pockets, if desired. Thereafter when the pockets have been moved to a predetermined position with respect to the backing material the charge of granules in each pocket in turn is pushed positively outward so as to be deposited on the backing in the desired position and none of the granules can stick to the fins or fail to be deposited on the backing.

From the foregoing description of my invention it will be apparent that the elements of the machines employed and the manner of using the same may be varied considerably without departing from the spirit and scope of my invention. In view thereof it should be understood that the embodiments of my invention herein described and shown in the figures of the drawings are intended to be illustrative of my invention and are not intended to limit the scope thereof.

I claim:

1. A machine for use in the manufacture of floor covering or the like comprising a carrier having a plurality of thin spaced partitions thereon, means for varying the depth of the spaces between said partitions, means for filling said spaces with granules of uncured linoleum, means for removing excess granules from said spaces, means for moving a sheet of backing material through said machine, means for depositing granules from said spaces on adjacent areas of the upper surface of said backing material to form a continuous layer of granules of predetermined thickness, and means for varying the space between the extremities of said partitions and said sheet to exceed the depth of said spaces whereby said partitions will leave the granules of said layer undisturbed after the granules are deposited on said sheet.

2. A machine for use in the manufacture of floor covering or the like comprising a drum rotatable about a horizontal axis and having a plurality of radially projecting fins thereon forming pockets of uniform depth, means for varying the depth of said pockets, a hopper for receiving granules of uncured linoleum communicating with said drum to fill the pockets between said fins with said granules, means located near the top of said drum and adjacent the extremities of said fins for leveling off the granules in said pockets, a shield extending about said drum from a point near said leveling means to a point near the bottom of said drum to retain the granules in said pockets, means for supporting a sheet of backing material near the end of said shield in position to receive the granules from said pockets, means for coordinating the movement of said sheet and drum to substantially cover the sheet with a layer of said granules of uniform thickness, and means for varying the space between the extremities of said partitions and said sheet to exceed the depth of said spaces whereby said partitions will leave the granules of said layer undisturbed after the granules are deposited on said sheet.

3. A machine of the type set forth in claim 2 in which the hopper is provided with a partition to permit differently colored particles to be supplied to the drum transversely thereof for forming longitudinally extending deposits of differently colored granules on the sheet of backing material.

4. A machine for use in depositing granules of linoleum on a backing comprising a rotatable drum having a plurality of partitions extending radially therefrom to form pockets for receiving granules, members located between said partitions and spaced from the extremities thereof to form the bottoms of said pockets, and means carried by said drum and rotatable with respect thereto for varying the positions of said members and the depth of said pockets.

5. A machine for use in depositing granules of linoleum on a backing comprising a rotatable drum having a plurality of partitions extending radially therefrom to form pockets for receiving granules, members located between said partitions and spaced from the extremities thereof to form the bottoms of said pockets, and means carried by said drum and movable parallel to the axis thereof for varying the positions of said members and the depth of said pockets.

6. A machine for use in depositing granules of linoleum on a backing comprising a rotatable drum having a plurality of partitions extending radially therefrom to form pockets for receiving granules, members located between said partitions and spaced from the extremities thereof to form the bottoms of said pockets, and annular rings having a threaded engagement with said drum and engaging said members near the ends thereof, said rings and members having cooperating surfaces for varying the positions of said members and the depth of said pockets on rotation of said rings with respect to said drum.

7. A machine for use in depositing granules of linoleum composition on a backing in the manufacture of floor coverings or the like including a rotatable drum, radially extending means forming pockets on the surface of said drum for receiving granules of linoleum composition, a hopper having the side thereof open and communicating with the pockets on said drum through an arc of approximately 90 degrees terminating adjacent the top of the drum, means for rotating said drum in a direction to raise the pockets while they are in communication with the hopper whereby granules in said hopper tend to move upward with the drum from the lower portion of the hopper without becoming compacted as the drum rotates, and rotatable means located in the hopper and near the top of the drum for sweeping granules from the top of the pockets on the drum as the pockets approach a vertical position.

8. A machine for use in depositing granules of linoleum composition on a backing in the manufacture of floor coverings or the like including a rotatable drum, radially extending means forming pockets on the surface of said drum for receiving granules of linoleum composition, a hopper having the side thereof open and communicating with the pockets on said drum through an arc of approximately 90 degrees terminating adjacent the top of the drum, means for rotating said drum in a direction to raise the pockets while they are in communication with the hopper whereby granules in said hopper tend to move upward with the drum from the lower portion of the hopper without becoming compacted as the drum rotates, a shield extending about said drum from a point near the top thereof to a point near the bottom thereof to retain granules in said pockets as they are inverted by rotation of the drum, and means located in said hopper near the top of the drum and in advance of said shield for removing excess granules from said pockets whereby crowding and compacting of the granules between said radially extending means and said shield on rotation of the drum is avoided.

FRED W. GANS.